No. 618,881.  
J. W. HYATT.  
STRAINER FOR FILTERS.  
(Application filed Nov. 15, 1898.)  
Patented Feb. 7, 1899.

(No Model.) 2 Sheets—Sheet 1.

WITNESSES:  
Fr. N. Roehrich  
James C. Reilly

INVENTOR  
John W. Hyatt,  
BY  
J. E. Hindon Hyde  
ATTORNEY

No. 618,881. Patented Feb. 7, 1899.
J. W. HYATT.
STRAINER FOR FILTERS.
(Application filed Nov. 15, 1898.)
(No Model.) 2 Sheets—Sheet 2.

WITNESSES:
F. N. Roehrich
James C. Reilly

INVENTOR
John W. Hyatt,
BY
J. E. Hindon Hyde
ATTORNEY

UNITED STATES PATENT OFFICE.

JOHN W. HYATT, OF NEWARK, NEW JERSEY, ASSIGNOR TO THE NEW YORK FILTER MANUFACTURING COMPANY, OF NEW YORK, N. Y.

STRAINER FOR FILTERS.

SPECIFICATION forming part of Letters Patent No. 618,881, dated February 7, 1899.

Application filed November 15, 1898. Serial No. 696,524. (No model.)

*To all whom it may concern:*

Be it known that I, JOHN W. HYATT, a citizen of the United States, and a resident of the city of Newark, in the county of Essex and State of New Jersey, have invented certain new and useful Improvements in the Construction of Strainers for Filters, of which the following is a specification.

The invention relates to the construction of the strainer or bed upon which the sand or other filtering material rests; and it consists in peculiar features by which the strainer allows the escape of the filtered water without the accompaniment of any of the filtering material and also admits the wash-water for washing the filter-bed to all parts of such filter-bed.

I have shown my invention in connection with a well-known type of gravity-filter in which there are two chambers, the upper chamber containing the filtering material and constituting the filter-chamber proper and a lower sediment-chamber, although I do not confine my invention to this peculiar type of filter; but it may be used with any suitable filter.

My invention is illustrated in the accompanying drawings, in which—

Figure 1:
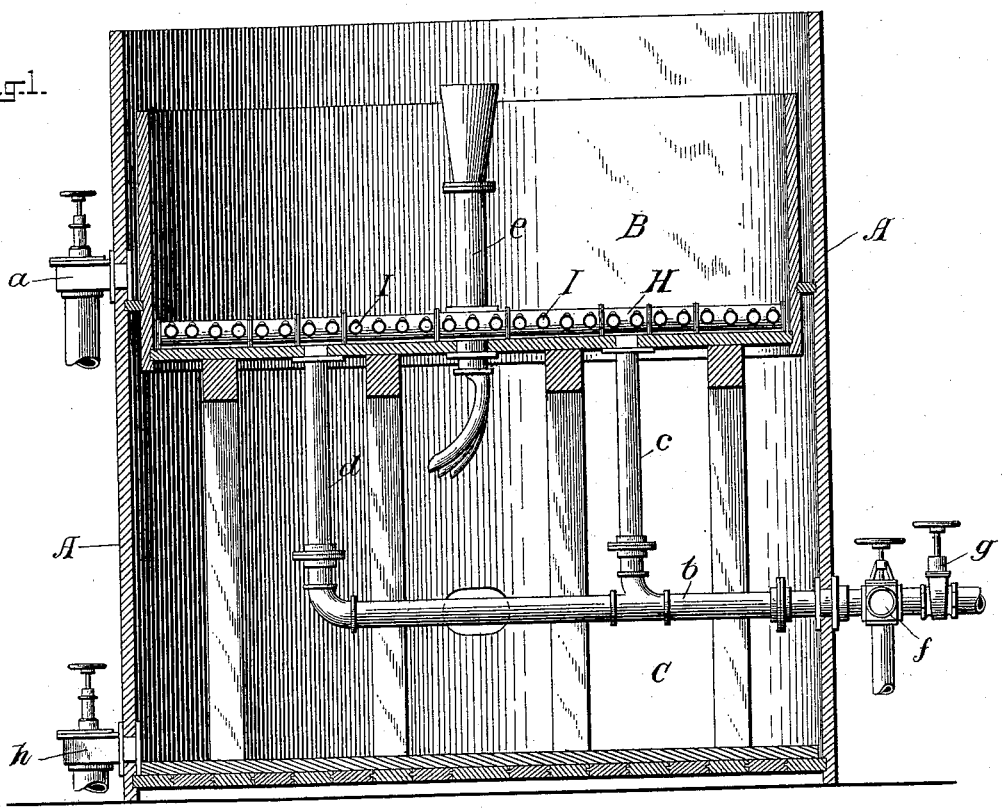
Figure 2:
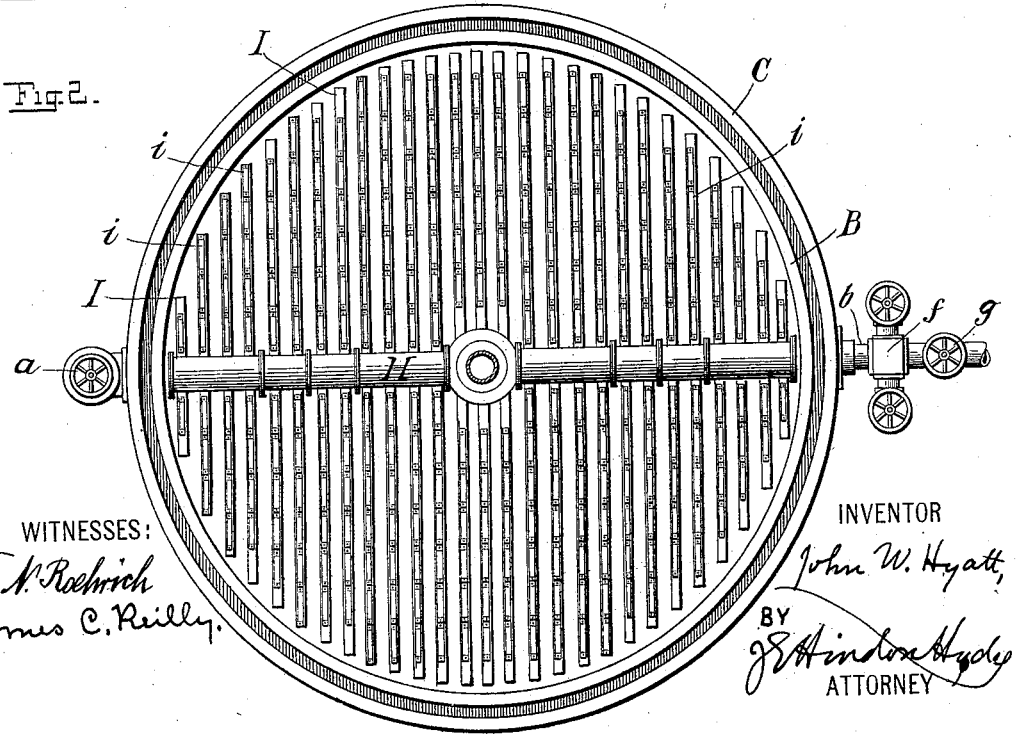
Figure 3:
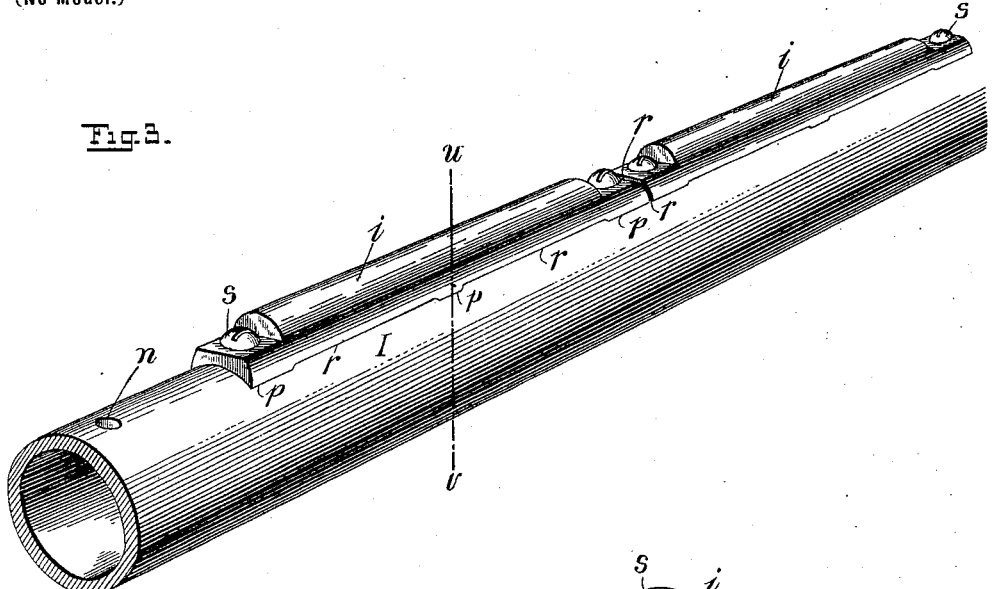
Figure 4:
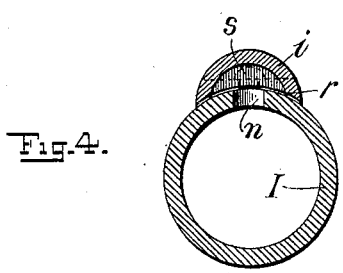
Figure 5:
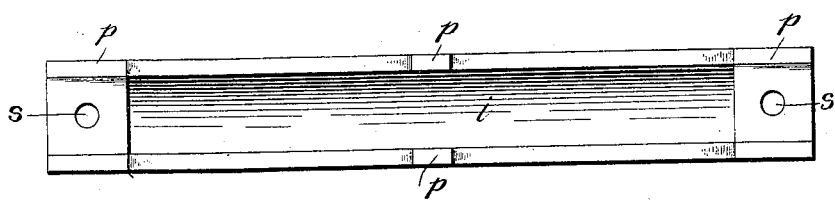
Figure 6:
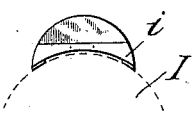

Figure 1 is a part sectional and part perspective view of the apparatus. Fig. 2 is a plan view. Fig. 3 is a perspective view of the particular portion of the apparatus which represents my invention. Fig. 4 is a sectional view of Fig. 3. Fig. 5 is a bottom view of the cap shown in Figs. 3 and 4, and Fig. 6 is an end view of the said cap.

Referring to the drawings, Figs. 1 and 2, A is the outer case of the filter, which is divided into two chambers. B or the upper chamber is that which contains the filtering material, (not shown,) and C is the sediment-chamber. The valve and pipe $a$ are the outlet for the wash-water from the chamber B, this water overflowing from the chamber B into the annular recess between such chamber and the outer case A and out through the valve and pipe $a$. A rotatable wash-pipe for the sediment-chamber C is shown at $e$, the means for rotating this pipe not being shown. The pipe $b$ is divided into two branches $d$ and $c$, which communicate with the bottom of the filtering-chamber B and furnish an outlet for the filtered water as well as an inlet for the wash-water. The valves $f$ and $g$ are valves for the outlet for the filtered water and the inlet for the wash-water, the valve $f$ being a double valve, as shown in Fig. 2, to permit of washing either with filtered or unfiltered water, as desired. The valve $h$ is the outlet-valve for the wash-water and sediment from the chamber C.

Resting upon the bottom of the filtering-chamber B and suitably secured thereto there is a grid or strainer (shown in Figs. 1 and 2) upon which the filtering material rests, and it is to the construction of this grid or strainer that my invention relates.

H is a central pipe, with which branch pipes $d$ and $c$ connect, and from the pipe H project laterally a series of small pipes I. These pipes I are perforated at their tops with a series of holes $n$, (shown in Fig. 3,) these holes being placed at such a distance apart— say six inches—and being of such a size as to permit the entrance of a requisite amount of wash-water for each unit of surface of the filter-bed. The aggregate capacity of these holes should be less than that of the main inlet-pipe $b$ for the wash-water. Each of the holes $n$ in the pipes I is covered with a cap $i$, (shown in detail in Figs. 3, 4, 5, and 6,) which is secured to the top of the pipe I by screws $s$. As will be seen from the drawings, these caps do not quite touch the top of the pipes I at all points, being kept from close contact therewith by the projections $p$, cast or otherwise formed upon the bottom edges of the caps $i$, thus leaving narrow slits or entrances or exits $r$ for the water. Another form of construction contemplates corrugating the bottom edges of these caps. The slits or openings should be of such a width that they will not permit the passage of the sand or filtering material through them while allowing the free ingress or egress of the water. As shown in the drawings, Figs. 3 and 5, the projections $p$ do not close the ends of the caps $i$, and the caps are placed at a small distance apart from each other upon the top of the pipes I, so that they leave an exit and entrance for the water $r$, this slit also being so narrow as not to permit the escape of the filtering material. The drawings are not made to scale, and a convenient length for these caps is about six inches, although they may be of any suitable length adapted to the number of the orifices $n$ in the pipes I, the latter being proportioned to the volume of water admitted by the inlet-pipe $b$, as above stated. Of course it will be obvious that instead of making the projection $p$ upon the caps $i$ the caps may have plane bottoms and the projections may be placed by any suitable means upon the pipes I without departing from the spirit of my invention, although I prefer the construction shown in the drawings. I have shown the caps as semicircular in cross-section; but it will be obvious that the caps may be conoidal, pyramidal, or even rectangular in shape, although I prefer a form which will prevent an undisturbed lodgment of the sand or filtering material upon the top thereof, and thus permit a perfect washing.

It will be apparent from the construction of my strainer before described that there is a free outlet at all points for the filtered water uncontaminated by escaping filtering material, and at the same time the wash-water is admitted freely to all portions of the bottom of the filter-chamber and thence up through the filtering material, thereby securing a perfect washing of all portions of this filtering material.

Having thus described my invention, what I claim, and desire to secure by Letters Patent, is—

1. In a filter, a strainer consisting of a series of perforated pipes the perforations in which are covered by caps secured thereto, constructed substantially as described, so as to cause the water to flow between the surface of the pipes and the bottom of the caps, substantially as and for the purpose set forth.

2. In a filter, a strainer consisting of a series of perforated pipes the perforations in which are covered by caps, substantially as described, resting on said pipes on projections and secured thereto, so as to cause the water to flow between the surface of the pipes and the bottom of the caps, substantially as and for the purpose set forth.

3. In a filter, a strainer consisting of a series of perforated pipes I, and caps $i$, substantially as described.

JOHN W. HYATT.

Witnesses:
J. E. HINDON HYDE,
JAMES C. REILLY.